Figure 1:
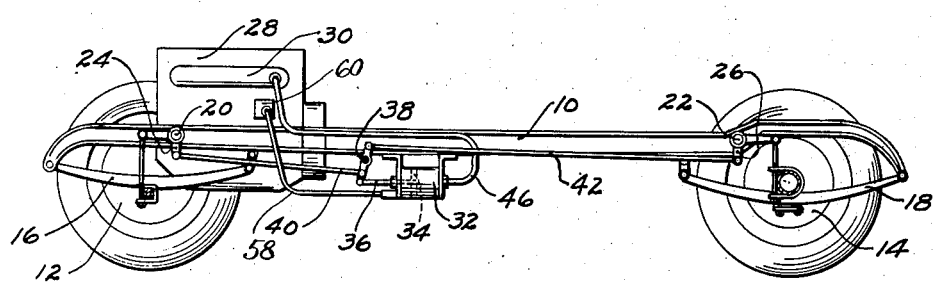

Dec. 20, 1938.  R. S. SANFORD  2,140,767

SHOCK ABSORBER CONTROL MECHANISM

Filed Nov. 21, 1935

INVENTOR.
ROY S. SANFORD.
BY  *A. E. Wilson*
ATTORNEY.

Patented Dec. 20, 1938

2,140,767

UNITED STATES PATENT OFFICE 2,140,767

SHOCK ABSORBER CONTROL MECHANISM

Roy S. Sanford, New York, N. Y., assignor to Bendix Products Corporation, South Bend, Ind., a corporation of Indiana Application November 21, 1935, Serial No. 50,830

13 Claims. (Cl. 188—87)

This invention relates to shock absorbers adapted for use with automotive vehicles, and more particularly to means for automatically controlling the resiliency of the shock absorbers to obtain the most comfortable riding characteristics and stability of the vehicle at various operating speeds.

In the use of shock absorbers with automotive vehicles it is desirable that the shock absorber be more flexible when the vehicle is being operated at low speeds, and to be more rigid, to damp out road shocks, when the vehicle is being operated at high speeds.

Shock absorbers for automotive vehicles have been produced wherein manually operable means are provided to vary the resistance of the absorber by merely actuating a control valve or lever. It has been found impractical to attempt to vary the resiliency of the absorber by manually operable means, because the required resiliency of the shock absorber during normal operation of the vehicle varies between wide limits. It is therefore desirable that the resiliency of the shock absorbers be controlled by means automatically operable in accordance with engine operating conditions. When the vehicle has been operating at high speed, with the shock absorbers set to provide maximum resistance, it is desirable that the resistance of the absorbers be gradually decreased as the vehicle is decelerated to avoid rough operation during deceleration.

An object of this invention is therefore to provide means operated by engine operating variables to control the resiliency of the shock absorber for automotive vehicles in accordance with the operating conditions of the engine.

Another object of the invention is to provide a power cylinder operably connected to the intake manifold of the engine, and to the control means for the shock absorber to vary the resistance of the shock absorber in accordance with the vacuum existing in the intake manifold.

A still further object of the invention is to provide vacuum power actuated means adapted to vary the resistance of the shock absorbers of a vehicle having means to delay the operation of the power means when the manifold vacuum is suddenly increased while the vehicle is operating at high speeds.

A further object of the invention is to provide a controllable shock absorber for automotive vehicles wherein vacuum power actuated means are employed to decrease the resistance of the shock absorbers, and oil pressure operated means are employed to delay the operation of the vacuum actuated means when the engine is suddenly decelerated.

Another object of the invention is to provide an automotive vehicle with shock absorbers on both the front and the rear wheels having vacuum power actuated means for varying the resistance of the front and rear shock absorbers to obtain maximum riding comfort for the passengers of the vehicle.

A further object of the invention is to provide means for controlling the shock absorbers of an automotive vehicle comprising manifold vacuum actuated means to decrease the resiliency of the shock absorbers when the engine is operating at low speed, and check valve means interposed in the vacuum actuated means to delay the operation of the control means under certain operating conditions.

Other objects and advantages of this invention will be apparent from the following detailed description considered in connection with the accompanying drawing, submitted for purposes of illustration only and not intended to define the scope of the invention, reference being had for that purpose to the subjoined claims.

Figure 2:
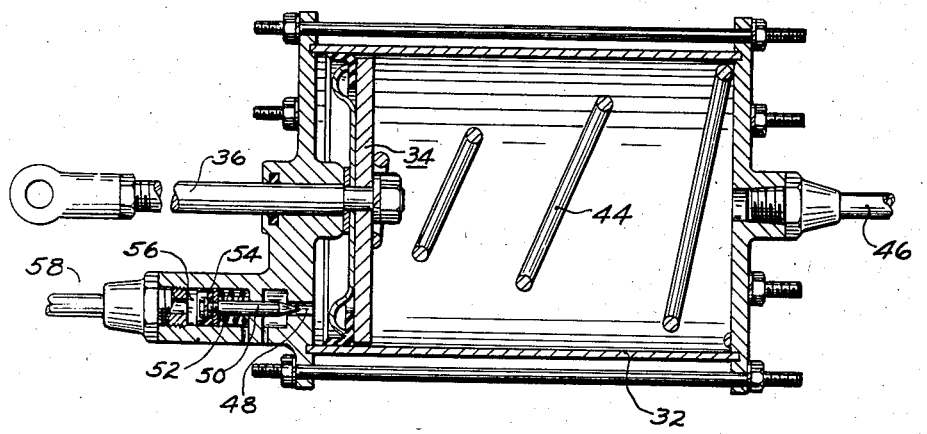

In the drawing wherein similar reference characters refer to similar parts in both views:

Figure 1 is a vertical section through an automobile chassis and engine, equipped with shock absorber control means in accordance with the present invention; and Figure 2 is an enlarged view of the shock absorber control means illustrated in Figure 1.

Referring more particularly to Figure 1 there is shown an automobile vehicle chassis including longitudinal frame members 10 equipped with front wheels 12 and rear wheels 14. The front wheels 12 are connected to the frame 10 by means of springs 16, and the rear wheels 14 are connected to the frame 10 by rear springs 18. Shock absorbing devices, which may be of the hydraulic or friction actuated type 20 and 22 are interposed between the axle front spring 16 and the frame 10 and the rear axle and rear spring 18 and the frame 10 respectively. These shock absorbers operate to resist movement of the frame 10 relative to the wheels 12 and 14, and are provided with means including the levers 24 and 26 respectively to vary the resistance of the shock absorbers. When the control levers 24 and 26 are moved in one direction, the resiliency of the shock absorbers is increased, to absorb a greater portion of the load.

An engine 28 is supported by the frame 10, and operates to supply power to drive the vehicle. The engine 28 is provided with an intake manifold 30 providing a source of vacuum, wherein at high speed operation of the engine the vacuum is practically zero, and at low speed operation the maximum vacuous condition is obtained.

Means are employed to utilize the high vacuum existing in the intake manifold 30 at low speeds to decrease the resistance of the shock absorbers 20 and 22, to more adequately absorb road shocks, and to utilize the high speed operating condition of the engine wherein substantially no vacuum is obtained in the intake manifold 30 to control the shock absorbers 20 and 22, to increase the resistance of the shock absorbers. The control means comprises a power cylinder 32 carried by the frame 10 of the vehicle and provided with a piston 34 slidable within the cylinder 32 and connected by means of a rod 36 with a cross shaft 38 carried by the frame 10, connected to the control levers 24 and 26 of the shock absorbers by means of rods 40 and 42 respectively. A spring 44 is provided in the cylinder 32 to yieldingly urge the piston 34 toward one extreme position to rotate the cross shaft 38 and to operate the control levers 24 and 26 to increase the resistance of the shock absorbers.

Means including a conduit 46 interconnect one end of the power cylinder 32 with the intake manifold 30 to subject a portion of the cylinder 32 to a vacuous condition to move the piston 34 longitudinally in the cylinder 32 to compress the spring 44 and lower the resistance of the shock absorbers 20 and 22 when a high vacuous condition exists in the intake manifold 30.

A vent 48 is provided in the other end of the cylinder 32 behind the piston 34 to permit air to flow into the cylinder 32 as a vacuous condition is produced in the cylinder on the opposite side of the piston 34, to provide a differential of fluid pressures on opposite sides of the piston 34, to move the piston longitudinally in the cylinder 32. Means including a check valve 50 yieldingly urged toward the open position by a spring 52 are provided to control the vent 48. The check valve 50 is controlled by a piston 54 slidably mounted in a cylinder 56. The cylinder 56 communicates with an oil pressure line 58 connected to an oil pump 60 whereby pressure may be exerted on the piston 54 in the cylinder 56 to move the check valve 50 and close the vent 48 when the oil pressure reaches a predetermined pressure.

The operation of this device is as follows. When the vehicle is being operated at low speeds, a high vacuum exists in the intake manifold 30. The high vacuous condition operates to withdraw air from one end of the cylinder 32 through the conduit 46 whereupon a force is exerted to move the piston 34 toward one extreme position. Movement of the piston 34 operates through the rod 36 to rotate the cross shaft 38 to move the control levers 24 and 26 to decrease the resistance of the shock absorbers 20 and 22. The resistance of the shock absorbers 20 and 22 being very small the maximum riding comfort of the vehicle in insured. As the engine is speeded up to increase the speed of the vehicle, the vacuum in the manifold 30 is destroyed whereupon the spring 44 in the cylinder 32 operates to move the piston 34 and the connecting linkage to increase the resistance of the shock absorbers. At high speed operation of the vehicle substantially no vacuum exists in the intake manifold 30, and the piston 34 is moved to one extreme position in the cylinder 32. The resistance of the shock absorbers 20 and 22 is then increased to insure a stable, comfortable ride at high speed operation of the vehicle.

In the operation of an engine the intake manifold vacuum is of course dependent upon the throttle position. The pressure in the manifold reflects the variations of throttle position and engine speed almost instantaneously. The pressure developed by the oil pump, however, does not follow variations of engine speed closely because a short interval of time is required for the oil pump to develop pressure in the circulated lubricant. When the engine is decelerated the manifold vacuum increases almost instantly when the throttle valve is closed; however, a short interval of time is required for the oil pressure to drop. It thus appears that the manifold vacuum follows variations in throttle position and engine speed almost instantaneously, while the oil pressure lags considerably behind both when the engine is accelerated and when it is decelerated.

It is desirable that the resistance of the shock absorbers remain high and be progressively decreased as the speed of the vehicle is decreased. It is therefore necessary that some means be provided to delay the operation of the power means when the throttle is closed quickly while the engine is operating at high speed. At high operating speeds of the vehicle the oil pressure is high, and being transmitted through the conduit 58 to the cylinder 56 operates through the piston 54 to move the needle valve 50 to close the vent 48 in the end of the cylinder 32. One end of the cylinder 32 is then closed, so that the vacuum existing in the manifold 30 is prevented from moving the piston 34 to control the shock absorbers until the engine speed has decreased to such a point that the oil pressure drops sufficiently to permit the spring 52 to move the needle valve 50 out of the vent 48. The piston 34 then moves longitudinally in the cylinder 32, compressing the spring 44 to decrease the resistance of the shock absorbers 20 and 22.

Means are thus provided for controlling the resistance of the shock absorbers in accordance with engine operating conditions to give maximum riding comfort at all operating speeds of the vehicle.

If desired the relative resistance exerted by the shock absorbers 20 and 22 may be varied with respect to each other by varying the length of the lever arms interconnecting the cross shaft 38 with the control levers 24 and 26. It is thus possible to obtain any desired variation of resistance between the shock absorbers 20 and 22.

Although the invention has been described with particular reference to manifold vacuum and oil pressure operated means for controlling the shock absorbers, it is to be understood that other engine variables may be employed to control the resistance of the shock absorbers.

While the invention has been described with particular reference to a preferred embodiment thereof it is to be understood that the scope of the invention is not to be limited to the particular features described nor otherwise than by the terms of the following claims.

I claim:

1. A vehicle having a frame, an engine, front and rear wheels, shock absorbers interposed between the wheels and the frame, means to vary the resistance of the shock absorbers, and means operated by engine oil pressure and manifold vacuum to control the resistance of the shock absorbers.

2. In a vehicle having a frame an engine including an intake manifold and an oil pump, a plurality of wheels, shock absorbers associated with the wheels, means to control the resistance of the shock absorbers, manifold vacuum operated means to operate the control means, and oil pressure operated means to delay the operation of the control means.

3. A vehicle having a frame, an engine including an intake manifold, front and rear wheels, shock absorber control means for the front and rear wheels, means for varying the resistance of the shock absorbers, means including a manifold vacuum operated power unit to decrease the resistance of the shock absorbers at high vacuum, yielding means in the cylinder to increase the resistance of the shock absorbers at low vacuum, and check valve means to delay the operation of the control means when a high vacuum is suddenly exerted in the intake manifold.

4. In a vehicle having an engine including an intake manifold and an oil pump, front and rear wheels, shock absorbers carried by the front and rear wheels, means to vary the resistance of the shock absorbers, manifold vacuum operated means to control the varying means, and oil pressure operated means to modify the action of the control means.

5. A vehicle having an engine including a source of differential fluid pressure, front and rear wheels, shock absorbers associated with the front and rear wheels, means to vary the resistance of the shock absorbers, differential fluid pressure actuated means to decrease the resistance of the shock absorbers at low speeds of the vehicle and to increase the resistance of the shock absorbers at high speeds of the vehicle, and auxiliary differential fluid pressure actuated means to delay the operation of the control means.

6. In a vehicle having an engine, a frame, front and rear wheels, shock absorber means associated with the front and rear wheels, means to vary the resistance of the shock absorbers, differential fluid pressure operated means to control the varying means, and auxiliary differential fluid pressure operated means to delay the operation of the control means.

7. A vehicle including a frame, an engine provided with an intake manifold, front and rear wheels, shock absorbers adapted to resist relative movement between the wheels and the frame, means to vary the resistance of the shock absorbers, means operated by manifold vacuum to vary the resistance of the shock absorbers, and means to vary the time of operation of the last named means.

8. A vehicle having a frame, an engine including an intake manifold and an oil pump, front and rear wheels, shock absorber control means associated with the wheels, means for varying the resistance of the shock absorbers, means including a manifold vacuum operated power unit to decrease the resistance of the shock absorbers at high vacuum, yielding means in the cylinder to increase the resistance of the shock absorbers at low vacuum, check valve means to delay the operation of the control means when a high vacuum is suddenly exerted in the intake manifold, and oil pressure operated means to control the check valve means.

9. In a vehicle having an engine including an intake manifold and an oil pump, front and rear wheels, shock absorbers carried by the front and rear wheels, means to vary the resistance of the shock absorbers, means including a power unit operably connected to the intake manifold to control the varying means, and oil pressure operated means to modify the action of the control means.

10. A vehicle having an engine including a plurality of courses of differential fluid pressures, front and rear wheels, shock absorbers associated with the front and rear wheels, means to vary the resistance of the front and rear shock absorbers, differential fluid pressure actuated means to decrease the resistance of the shock absorbers at low speeds of the vehicle and to increase the resistance of the shock absorbers at high speeds of the vehicle, and auxiliary differential fluid pressure actuated means to delay the operation of the control means.

11. In a vehicle having an engine, a frame, front and rear wheels, shock absorber means associated with the front and rear wheels, means to vary the resistance of the shock absorbers, differential fluid pressure operated means to control the varying means, and fluid pressure operated check valve means to delay the operation of the control means.

12. In a wheeled vehicle having a frame and an engine including a plurality of sources of differential fluid pressure, shock absorbing means, means to vary the resistance of the shock absorbing means, fluid pressure operated means to control the varying means, and auxiliary fluid pressure operated means to vary the time of operation of the control means.

13. In a vehicle having an engine including a plurality of sources of differential fluid pressure, front and rear wheels, shock absorbers associated with the front and rear wheels, means to vary the resistance of each shock absorber, fluid pressure operated means to control the varying means to vary the resistance of the shock absorbers of the front wheels with reference to the shock absorbers of the rear wheels, and auxiliary fluid pressure operated means to modify the action of the control means.

ROY S. SANFORD.